US011513292B2

(12) United States Patent
Nykänen et al.

(10) Patent No.: US 11,513,292 B2
(45) Date of Patent: Nov. 29, 2022

(54) WAVEGUIDE MIRROR AND METHOD OF FABRICATING A WAVEGUIDE MIRROR

(71) Applicant: ROCKLEY PHOTONICS LIMITED, London (GB)

(72) Inventors: Henri Nykänen, Helsinki (FI); John Paul Drake, St. Ives (GB); Evie Kho, Espoo (FI); Damiana Lerose, Pasadena, CA (US); Sanna Leena Mäkelä, Helsinki (FI); Amit Singh Nagra, Altadena, CA (US)

(73) Assignee: Rockley Photonics Limited

( * ) Notice: Subject to any disclaimer, the term of this patent is extended or adjusted under 35 U.S.C. 154(b) by 82 days.

(21) Appl. No.: 16/866,419

(22) Filed: May 4, 2020

(65) Prior Publication Data

US 2020/0264372 A1   Aug. 20, 2020

Related U.S. Application Data

(63) Continuation of application No. 16/368,605, filed on Mar. 28, 2019, now Pat. No. 10,641,962.

(30) Foreign Application Priority Data

Mar. 29, 2018   (GB) ...................... 1805241

(51) Int. Cl.
*G02B 6/26* (2006.01)
*G02B 6/125* (2006.01)
(Continued)

(52) U.S. Cl.
CPC .......... *G02B 6/26* (2013.01); *G02B 6/12004* (2013.01); *G02B 6/125* (2013.01); *G02B 6/136* (2013.01);
(Continued)

(58) Field of Classification Search
CPC ...... G02B 6/26; G02B 6/12004; G02B 6/125; G02B 6/136; G02B 6/4214; G02B 2006/12061; G02B 2006/12104
See application file for complete search history.

(56) References Cited

U.S. PATENT DOCUMENTS

| 8,435,809 B2 | 5/2013 | Heck et al. |
| 8,492,245 B1 | 7/2013 | Lagally et al. |

(Continued)

FOREIGN PATENT DOCUMENTS

| CN | 209803375 U | 12/2019 |
| EP | 2 813 873 A1 | 12/2014 |
| WO | WO 2019/056799 A1 | 3/2019 |

OTHER PUBLICATIONS

U.K. Intellectual Property Office Examination Report, dated Aug. 11, 2020, for Patent Application No. GB1805241.5, 2 pages.
(Continued)

*Primary Examiner* — Jennifer Doan
(74) *Attorney, Agent, or Firm* — Lewis Roca Rothgerber Christie LLP

(57) ABSTRACT

A mirror and method of fabricating the mirror, the method comprising:
providing a silicon-on-insulator substrate, the substrate comprising: a silicon support layer; a buried oxide (BOX) layer on top of the silicon support layer; and a silicon device layer on top of the BOX layer; creating a via in the silicon device layer, the via extending to the BOX layer; etching away a portion of the BOX layer starting at the via and extending laterally away from the via in a first direction to create a channel between the silicon device layer and silicon support layer; applying an anisotropic etch via the channel to regions of the silicon device layer and silicon support layer adjacent to the channel; the anisotropic etch following an orientation plane of the
(Continued)

silicon device layer and silicon support layer to create a cavity underneath an overhanging portion of the silicon device layer; the overhanging portion defining a planar underside surface for vertically coupling light into and out of the silicon device layer; and applying a metal coating to the underside surface.

19 Claims, 15 Drawing Sheets

(51) Int. Cl.
    *G02B 6/136* (2006.01)
    *G02B 6/12* (2006.01)
    *G02B 6/42* (2006.01)

(52) U.S. Cl.
    CPC .. *G02B 6/4214* (2013.01); *G02B 2006/12061* (2013.01); *G02B 2006/12104* (2013.01); *G02B 2006/12176* (2013.01); *G02B 2006/12178* (2013.01)

(56) References Cited

U.S. PATENT DOCUMENTS

| | | | |
|---|---|---|---|
| 8,803,268 | B2 | 8/2014 | Heck et al. |
| 8,988,770 | B2 | 3/2015 | Zheng et al. |
| 9,195,007 | B2 | 11/2015 | Heck et al. |
| 9,726,553 | B2 | 8/2017 | Ahmed et al. |
| 9,753,218 | B2 | 9/2017 | Kraft et al. |
| 9,761,746 | B2 | 9/2017 | Kang et al. |
| 9,791,641 | B2 | 10/2017 | Heck et al. |
| 10,641,962 | B2 * | 5/2020 | Nykanen ................ G02B 6/136 |
| 2011/0073972 | A1 | 3/2011 | Heck et al. |
| 2011/0156183 | A1 | 6/2011 | Liu |
| 2013/0216177 | A1 | 8/2013 | Tseng et al. |
| 2014/0003766 | A1 | 1/2014 | Heck et al. |
| 2014/0355929 | A1 | 12/2014 | Tseng et al. |
| 2014/0363120 | A1 | 12/2014 | Stephens et al. |
| 2016/0306110 | A1 | 10/2016 | Lambert |
| 2016/0306111 | A1 * | 10/2016 | Lambert ................ G02B 6/125 |
| 2020/0218012 | A1 | 7/2020 | Wang et al. |

OTHER PUBLICATIONS

U.K. Intellectual Property Office Search Report, dated May 1, 2020, for Patent Application No. GB1805241.5, 3 pages.

Bargiel, Sylwester et al., "Towards Micro-Assembly of Hybrid MOEMS Components on Reconfigurable Silicon Free-Space Micro-Optical Bench", Journal of Micromechanics and Microengineering, Oct. 11, 2010, 21 pages, IOP Publishing.

Cheben, P. et al., "Out-of-plane total internal reflection coupling mirrors in silicon-on-insulator ridge waveguides", 2006 3rd IEEE International Conference on Group IV Photonics, Sep. 13, 2006, pp. 146-148, IEEE.

Hirsch, Marzena et al., "Enhancement of fiber-optic low-coherence Fabry-Pérot interferometer with ZnO ALD films", Optical Technologies in Biophysics and Medicine XIX, Sep. 26, 2017, vol. 10716, SPIE.

International Search Report and Written Opinion of the International Searching Authority, dated Aug. 26, 2019, Corresponding to PCT/EP2019/058104, 23 pages.

U.K. Intellectual Property Office Search and Examination Report, dated Aug. 29, 2018, for Patent Application No. GB1805241.5, 8 pages.

U.K. Intellectual Property Office Search and Examination Report, dated Aug. 6, 2021, for Patent Application No. GB2103977.1, 5 pages.

Chinese Notification of the First Office Action, for Patent Application No. 201910286038.2, dated Jun. 6, 2022, 7 pages.

Partial English translation of the Chinese Notification of the First Office Action, for Patent Application No. 201910286038.2, dated Jun. 6, 2022, 12 pages.

* cited by examiner

WAVEGUIDE MIRROR AND METHOD OF FABRICATING A WAVEGUIDE MIRROR

CROSS-REFERENCE TO RELATED APPLICATION(S)

The present application is a continuation of U.S. patent application Ser. No. 16/368,605, filed Mar. 28, 2019, entitled "WAVEGUIDE MIRROR AND METHOD OF FABRICATING A WAVEGUIDE MIRROR", which claims priority to United Kingdom Application No. GB1805241.5, filed Mar. 29, 2018, entitled "WAVEGUIDE MIRROR AND METHOD OF FABRICATING A WAVEGUIDE MIRROR", the entire contents of all documents identified in this paragraph are hereby incorporated herein by reference as if fully set forth herein.

FIELD

One or more aspects of embodiments according to the present invention relate to waveguide mirrors and methods of fabricating waveguide mirrors, and more particularly to waveguide mirrors fabricated on a silicon-on-insulator substrate.

BACKGROUND

Silicon photonics is a fast growing technology, where the demand for optical solutions meets silicon chip fabrication techniques. Typically, fabrication of optical components is carried out on a silicon-on-insulator wafer with a support layer of silicon, and intermediate insulator layer and a silicon device layer located on top of the insulator layer.

In general, when designing optical components, there is a desire to avoid complicated fabrication techniques and the associated fabrication timescales. There is also a desire to avoid components with large footprints.

SUMMARY

According to embodiments of a first aspect of the present invention, there is provided: a method of fabricating a mirror, the method comprising:
providing a silicon-on-insulator substrate, the substrate comprising: a silicon support layer; a buried oxide (BOX) layer on top of the silicon support layer; and a silicon device layer on top of the BOX layer;
creating a via in the silicon device layer, the via extending to the BOX layer;
etching away a portion of the BOX layer starting at the via and extending laterally away from the via in a first direction to create a channel between the silicon device layer and silicon support layer;
applying an anisotropic etch via the channel to regions of the silicon device layer and silicon support layer adjacent to the channel; the anisotropic etch following an orientation plane of the silicon device layer and silicon support layer to create a cavity underneath an overhanging portion of the silicon device layer; the overhanging portion defining a planar underside surface for vertically coupling light into and out of the silicon device layer; and
applying a metal coating to the underside surface.

In this way, the mirror structure is "flipped" as compared to conventional silicon waveguide mirrors since the reflective surface is formed on an underside surface. Advantageously, this removes the need for light to travel through a silicon-air interface before being reflected by the mirror. Travel through air causes more scattering and more optical loss. Rough surfaces also lead to extra losses, so the exit through the smooth upper surface of the silicon device layer of the fabricated mirror is also advantageous.

The channel may also be referred to as a BOX undercut and serves the purpose of providing an entry route for the etchant which results in etching taking place from the bottom of the silicon device layer upwards. It is this process of etching from the bottom that gives rise to the desired overhang in the silicon device layer. The crystal structure of the silicon device layer means that the anisotropic etch process results in a planar underside surface.

Optionally, the etchant used in the anisotropic etch is one of: Tetramethylammonium hydroxide (TMAH), KOH or CsOH.

Optionally, the step of applying the metal coating to the underside surface is carried out by atomic layer deposition (ALD).

Optionally, the silicon device layer is {100} oriented. That is to say, the silicon-on-insulator wafer that is used as a starting point for fabrication for the device is cut along the {100} lattice plane (and equivalents) as defined using the Miller index. Note that whilst the wafer is usually cut along the (100) plane, equivalent planes (010) and (001) would give rise to the same effect. The orientation of the silicon in the silicon-on-insulator wafer can be indicated by the wafer flat. In other embodiments the crystal plane along which the wafer is cut may be the {110} plane (i.e. the (110) surface and equivalents). Brackets { } are used here to denote a family of equivalent planes, while round brackets ( ) are used to denote a specific plane.

In this way, because the via and channel have been created, the anisotropic etch is most selective to etching along the {111} plane, which results in an overhanging device layer with an underneath surface which extends along the {111} plane. That is to say, the resulting facet of the mirror lies along the {111} plane (i.e. (111), (−111), (1-11) or (11-1)). In such embodiments, the mirror surface will typically form an angle of 54.7 degrees to the direction of the incident light.

Advantageously, an angled mirror is produced without the need for a vertical etch face. The fact that the mirror surface is flipped on the underside of the device layer is particularly advantageous as it provides a mirror for reflecting light out of a silicon waveguide, up vertically or substantially vertically (i.e. perpendicular to or substantially perpendicular to) the plane along which the BOX layer lies.

In use, for light propagating along a silicon waveguide to the mirror, there is no exposure to air before the mirror. However, unlike other mirrors in which there is no air gap; the fabrication method of the present mirror does not require a filling step.

A cross-section image (Scanning Electron Microscope (SEM) or Focused Ion Beam (FIB)) would reveal the use of this invention. In a conventional mirror, the shapes are visible from the top view. If no mirror features are seen, it would indicate the use of this invention.

Optionally, the step of creating a via in the silicon device layer includes:
etching a via in the silicon device layer, the via extending from the upper surface of the silicon device layer down to the interface between the silicon device layer and the BOX layer, the via having a base and two sidewalls; and
applying a protective nitride layer to a region of the base.

Before the etch of the via, an initial patterning step may be required to remove an oxide layer on top of the silicon device layer. Standard photoresist patterning steps would typically be used to apply the protective nitride layer. The nitride layer serves to control the spread of the later anisotropic etch step. This gives rise to a greater flexibility during the fabrication of the cavity, specifically the process of undercutting the silicon device layer and the resulting number of overhanging regions created by the anisotropic etch. By preventing the anisotropic etch from reaching certain parts of the base of the via, it is possible to create a cavity with walls that include no more than one overhanging portion of the silicon device layer, and therefore no more than one underside surface for vertically coupling light into and out of the silicon device layer.

In some embodiments, a single mirror is fabricated from the initial via. In other embodiments, a plurality of mirror surfaces may be fabricated. Where only one mirror surface is fabricated, the nitride layer may be applied to a first portion of the base of the via; where the cavity, and associated underside surface is to be created by an anisotropic etch of the via at all regions except those covered by the protective nitride layer. Where more than one mirror surface is required, the protective nitride layer is typically located at a central portion of the base of the via. In this way, an anisotropic etch will result in a cavity which produces an "overhang" at either side of the protective nitride layer (and therefore at either side of the via). Each overhang defines a planar underside surface; that is to say a "flipped mirror".

Optionally, the step of etching away a portion of the BOX layer includes a step of first applying an additional protective patterning layer over the nitride layer.

According to embodiments of a second aspect of the present invention, there is provided a silicon photonic mirror comprising:

a silicon support layer; a buried oxide (BOX) layer on top of the silicon support layer; and a silicon device layer on top of the BOX layer;

a cavity extending through the silicon device layer, BOX layer and a region of the silicon support layer; the walls of the cavity including a planar underside surface defined by an overhanging portion of the silicon device layer, the planar underside surface for vertically coupling light into and out of the silicon device layer; and a metal surface applied to the planar underside surface.

According to embodiments of a third aspect of the present invention, there is provided a method of fabricating a mirror, the method comprising:

providing a silicon-on-insulator substrate, the substrate comprising: a silicon device layer on top of a BOX layer;

creating a V-groove in the silicon device layer, the V-groove extending to the BOX layer and having a first angled wall and a second angled wall;

providing a reflective coating to just one of the two angled walls of the V-groove to create a mirrored surface; and growing silicon on top of the reflective surface to fill the V-groove, the interface between the grown silicon and the reflective surface forming the reflective surface of the mirror.

Typically, the step of creating the V-groove includes an anisotropic etch using TMAH, KOH or CSOH. The etch process may include initial steps of etching a via, typically one extending vertically from an upper surface of the silicon device layer down to what will become the base of the via then applying the anisotropic etch to the via. The initial patterning step may simply remove an upper oxide layer in preparation for an anisotropic etch step. Where the silicon device layer has a {100} orientation, the walls of the V-groove will lie along a plane equal to or equivalent to the {111} plane (i.e. (111), (−111), (1-11) or (11-1)). That is to say, the resulting facet of the mirror lies along the {111} plane.

The V-groove is made up of two angled surfaces which may intersect or substantially intersect at the base of the groove to form the apex of the "V". In some embodiments, the base of the V-groove may have a plateau with a length of 5 μm or larger (the length being along a surface parallel to the plane of the BOX). The flat region at the base of the V-groove may be advantageous for ease of filling during the filling process.

Optionally, the reflective coating is an oxide layer.

Optionally, the reflective coating comprises a metal layer and an oxide layer; the surface of the mirror being located at the interface.

Optionally, the silicon grown to fill the V-groove is epitaxial silicon.

Optionally, the silicon grown to fill the V-groove is poly-silicon or amorphous silicon.

Optionally, the method further comprises the step of applying a nitride layer on top of the silicon that has been grown to fill the V-groove.

According to embodiments of a fourth aspect of the present invention, there is provided a silicon photonic mirror comprising:

a silicon device layer on top of a BOX layer;

a V-groove within the silicon device layer, the V-groove extending to the BOX layer and having a first angled wall and a second angled wall;

a reflective coating on no more than one of the two angled walls of the V-groove; and silicon on top of the reflective surface which fills the V-groove, the interface between the grown silicon and the reflective surface forming the reflective surface of the mirror.

Optionally, the reflective coating is an oxide layer.

Optionally, the reflective coating comprises a metal layer and an oxide layer; the surface of the mirror being located at the interface.

Optionally, the silicon which fills the V-groove is epitaxial silicon.

Optionally, the silicon which fills the V-groove is epitaxial silicon, is poly-silicon or amorphous silicon.

Optionally, the silicon photonic mirror further comprises a nitride layer on top of the silicon that has been grown to fill the V-groove.

According to embodiments of a fifth aspect of the present invention, there is provided a method of fabricating a mirror, the method comprising:

providing a silicon-on-insulator substrate, the substrate comprising: a silicon support layer; a buried oxide (BOX) layer on top of the silicon support layer; and a silicon device layer on top of the BOX layer;

creating a via in the silicon device layer, the via extending to the BOX layer;

etching away a portion of the BOX layer starting at the via and extending laterally away from the via in a first direction to create a channel between the silicon device layer and silicon support layer;

applying an anisotropic etch via the channel to regions of the silicon device layer and silicon support layer adjacent to the channel; the anisotropic etch following an orientation plane of the silicon device layer and silicon support layer to create a cavity underneath an overhanging portion of the silicon device layer; the overhanging portion defining a planar underside surface;

wherein the step of creating a via in the silicon device layer includes:

etching a via in the silicon device layer, the via extending from the upper surface of the silicon device layer down to the interface between the silicon device layer and the BOX layer, the via having a base and two sidewalls; and applying a protective nitride layer to a region of the base before etching away the portion of the BOX layer.

According to embodiments of a sixth aspect of the present invention, there is provided a silicon photonic mirror comprising:

a silicon support layer; a buried oxide (BOX) layer on top of the silicon support layer; and a silicon device layer on top of the BOX layer;

a cavity extending through the silicon device layer, BOX layer and a region of the silicon support layer; the walls of the cavity including no more than one planar underside surface defined by an overhanging portion of the silicon device layer, the planar underside surface for vertically coupling light into and out of the silicon device layer.

BRIEF DESCRIPTION OF THE DRAWINGS

These and other features and advantages of the present invention will be appreciated and understood with reference to the specification, claims, and appended drawings wherein:

DETAILED DESCRIPTION

Figure 1:
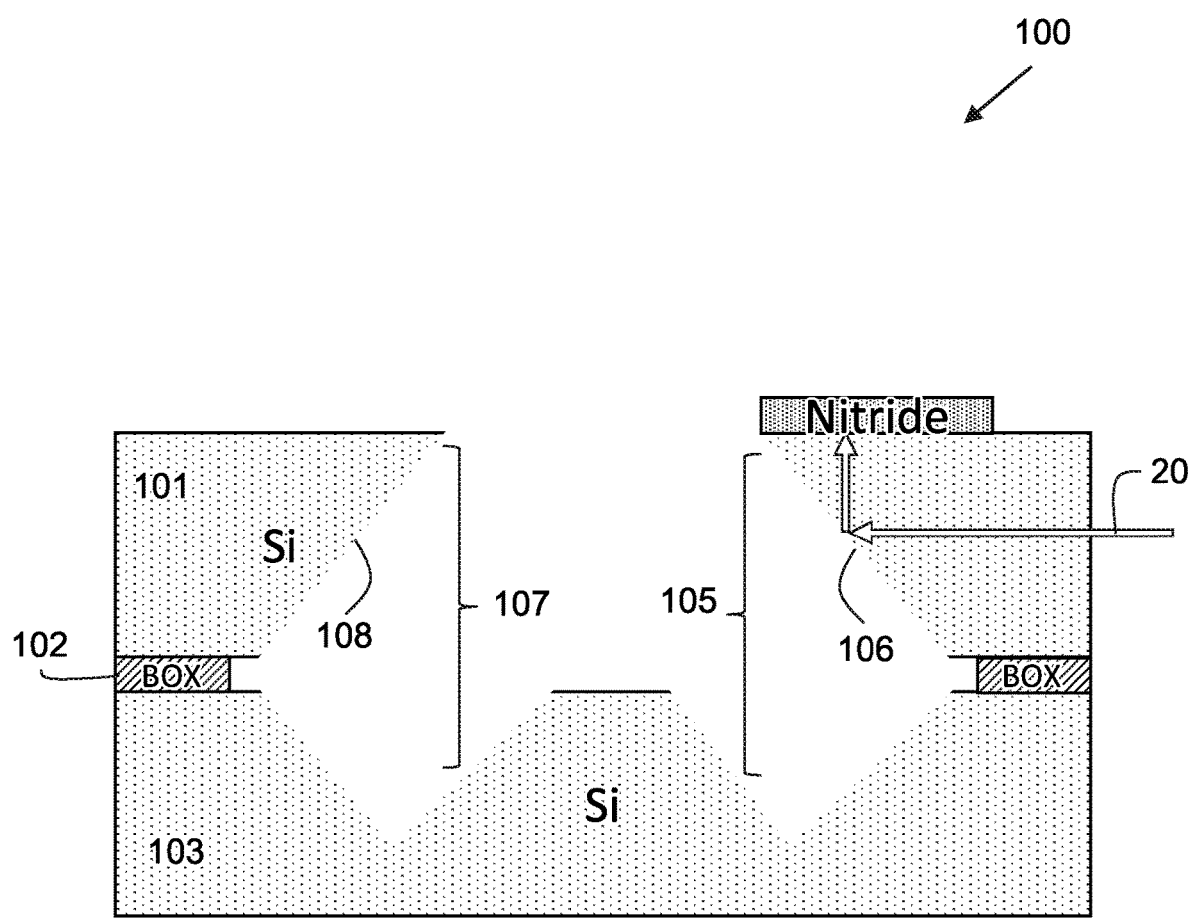
FIG. 1 is a schematic diagram of a silicon photonic mirror according to an embodiment of the present invention.

Silicon photonic mirrors 100, 200, 300 according to a first set of embodiments are described below with reference to FIGS. 1-3. These mirrors are designed to vertically couple light into or out of a silicon waveguide.

In each of these embodiments, the mirror is fabricated within a silicon-on-insulator (SOI) wafer, the wafer including a silicon device layer 101 on top of an insulator layer 102, the insulator taking the form of a buried oxide (BOX) layer. The insulator layer in turn is located on top of a silicon support layer 103. Typically, the silicon device layer and the silicon support layer are each layers of crystalline silicon wafer that have been sliced along the (100) plane or another plane equivalent to the (100) plane. The silicon device layer has a lower surface which forms a planar interface with the BOX layer, and an upper surface which forms the topmost layer of the SOI wafer. The silicon device layer may be patterned to include one or more silicon waveguides into and out of which light 20 is coupled by the mirror.

The mirror is a flipped mirror in that the mirror facet is formed by an underside planar surface in the silicon device layer, the underside planar surface having been formed by a "bottom-up" etch which undercuts the silicon device layer.

A cavity 105 within the mirror device is defined by, and extends through the silicon device layer, the BOX layer and at least a region of the silicon support layer; the walls of the cavity including an overhanging portion of the silicon device layer 101; the overhanging portion defining a planar underside surface 106 which acts as the mirror facet. Where the upper surface of the silicon device layer 101 lies along the (100) plane, the planar underside surface will lie along the (111) plane, thereby forming an angle of 54.7 degrees or substantially 54.7 degrees to the upper surface of the silicon device layer. However, it is envisaged that equivalent planes could give rise to the same desired effect of a planar underside surface.

Figure 2:
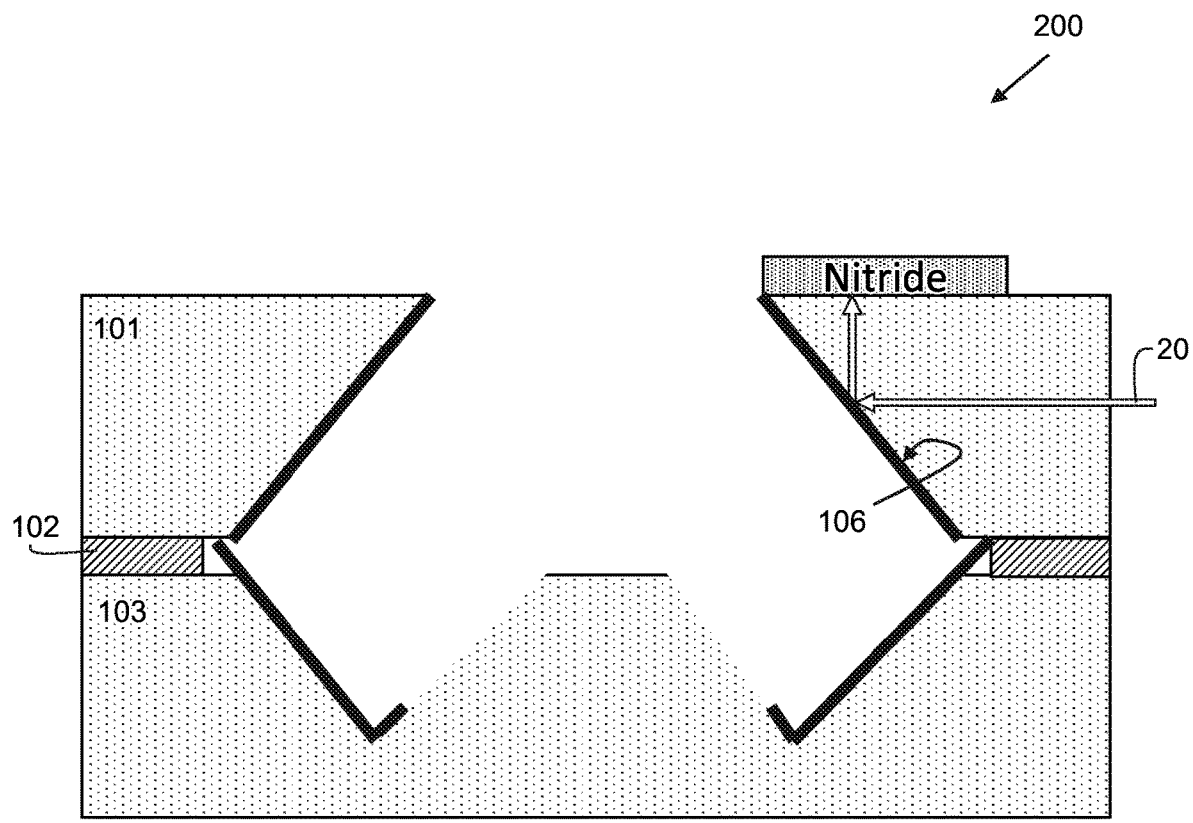
FIG. 2 is a schematic diagram of a silicon photonic mirror according to a further embodiment of the present invention.
Figure 3:
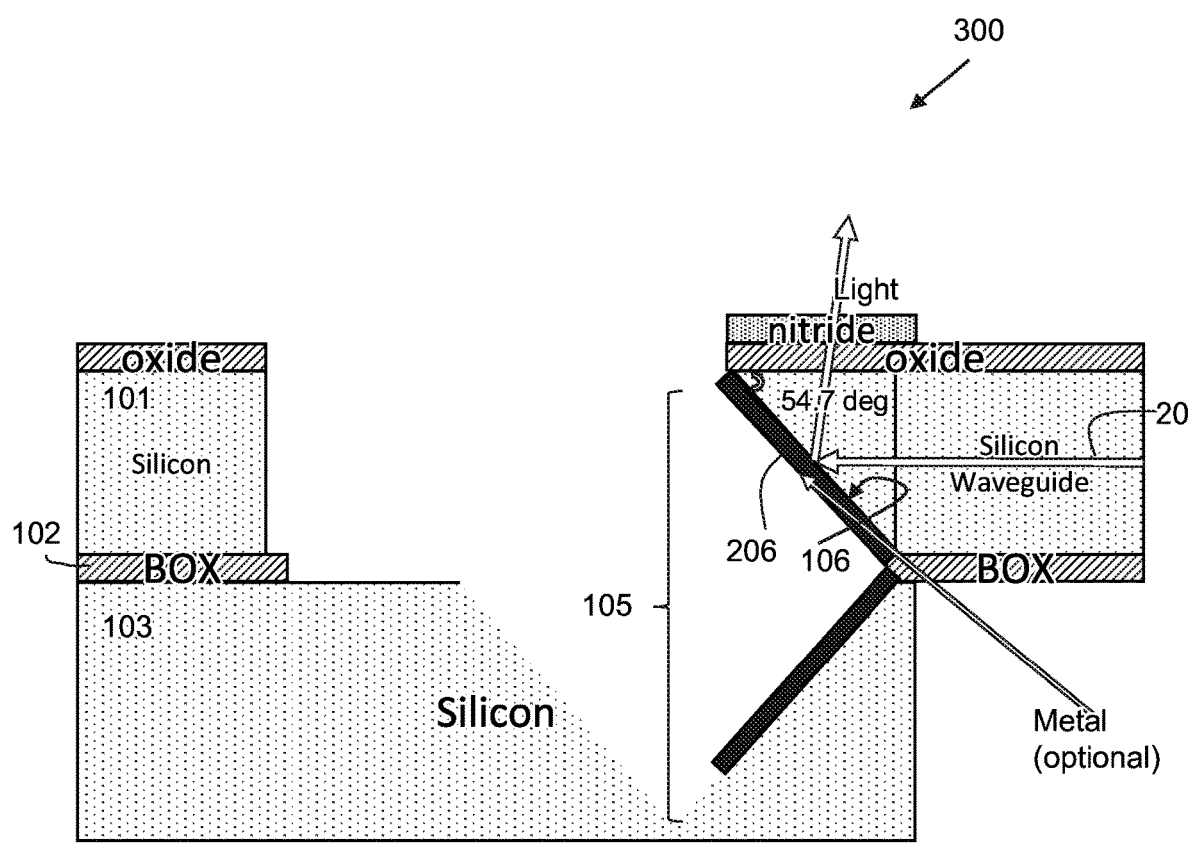
FIG. 3 is a schematic diagram of a silicon photonic mirror according to a further embodiment of the present invention.

In the embodiments depicted in FIGS. 1-3, the silicon device layer 101 acts as a silicon waveguide wherein light travels along a plane which is parallel to, or substantially parallel to the plane along which the upper surface of the silicon device layer lies and also the parallel to, or substantially parallel to the plane at which the lower surface of the silicon device layer forms an interface with the BOX layer.

In the embodiments shown in FIGS. 1 and 2, there is a second cavity 107, the walls of which include a second overhanging portion of the device layer, which defines a second underside surface 108. However, in the embodiment of FIG. 3, there is no more than one underside surface 106.

In the embodiments of silicon photonic mirrors depicted in FIGS. 2 and 3, an additional metal coating is applied to the underside layer(s) 106, 108 using Atomic Layer Deposition (ALD). Typically, this deposition will also affect other surfaces, leading to metal coatings on surfaces adjacent the planar underside surface 106.

An example of a method of fabrication of the mirror of FIG. 3 is described below with reference to FIGS. 4A-4P, where like reference numerals correspond to features already described in relation to those references.

Figure 4A:
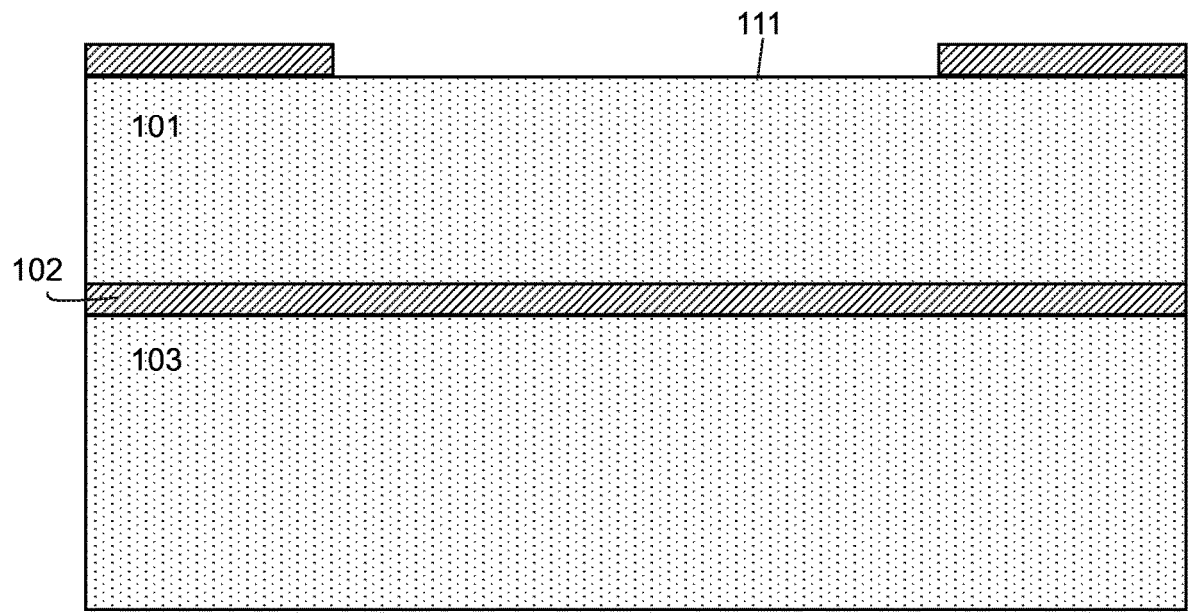
FIG. 4A-4P depict method steps in the fabrication of a photonic mirror according to an embodiment of the present invention.

Initially, as shown in FIG. 4A, an SOI substrate is provided with a patterned oxide on the upper surface of the silicon device layer 101, the patterning having taken place to expose a region of the upper surface 111. The patterned oxide layer is typically a thermal oxide to improve the quality of the interface between the silicon device layer and the oxide layer.

Figure 4B:
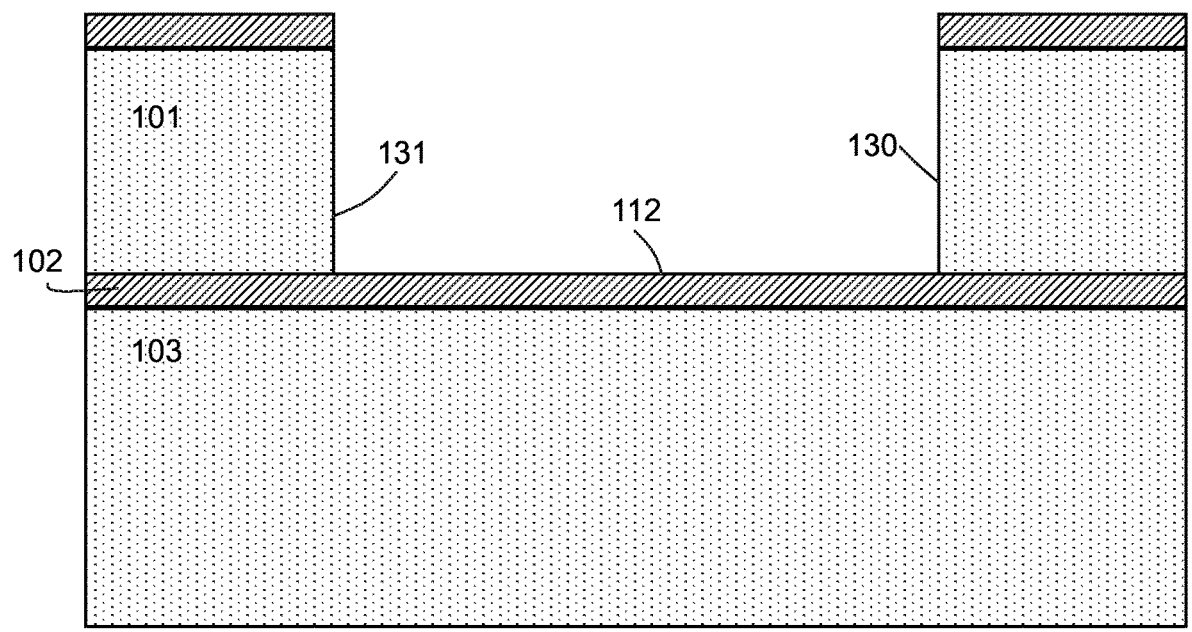

Subsequently, as depicted in FIG. 4B, a via is etched in the silicon device layer using a dry etch. In the embodiment shown, the via extends through the silicon device layer vertically or substantially vertically (i.e. roughly transverse to the interface between the BOX layer and the silicon device layer 101). Importantly, the via extends all the way from the upper surface 111 of the silicon device layer 101 to the buried oxide (BOX) layer 102, thereby exposing a portion of the BOX layer. The via has a base, a first sidewall 130, and a second sidewall 131; the first and second sidewalls being vertical or substantially vertical. The base 112 extends laterally along the upper surface of the BOX layer.

Figure 4C:
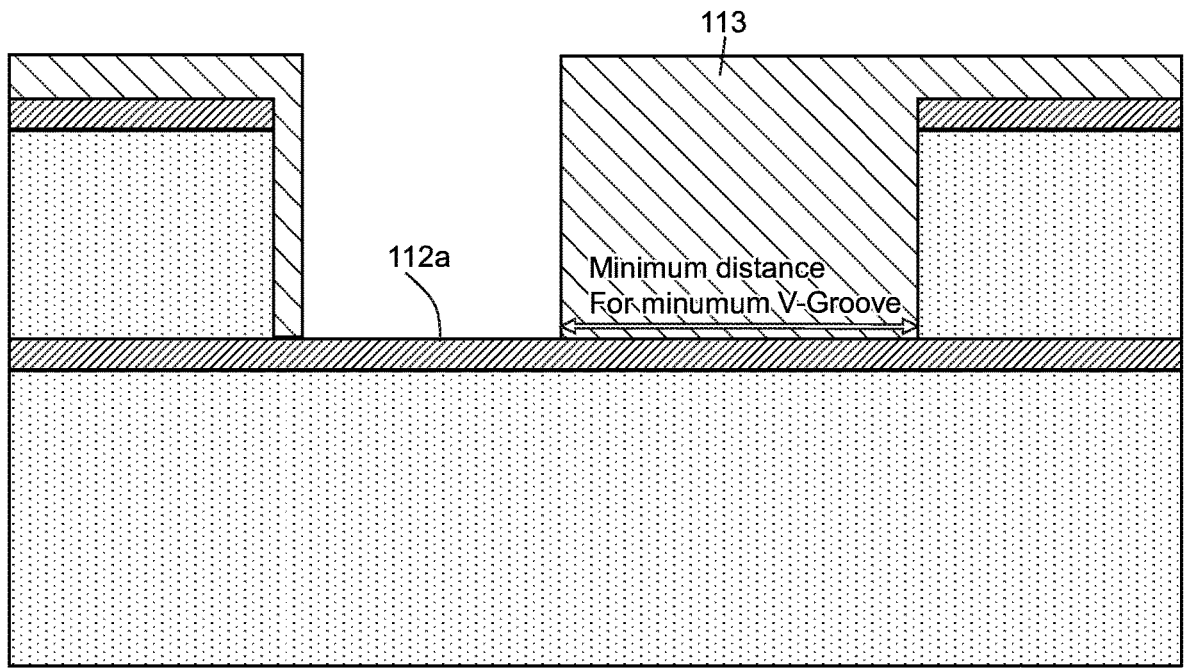

Next, as shown in FIG. 4C, a photoresist is applied over the whole substrate, after which a photo-lithography process is applied (photoresist irradiated with patterned UV light, followed by chemical development of the irradiated region on the 112a base area), leaving a region of the BOX layer 112a exposed.

The lateral dimensions of the patterned photoresist applied over the base correspond to the optimal distance required for a minimum residual underlying V-groove (below the level of the BOX layer 112a), while having the mirror surface fully formed.

Figure 4D:
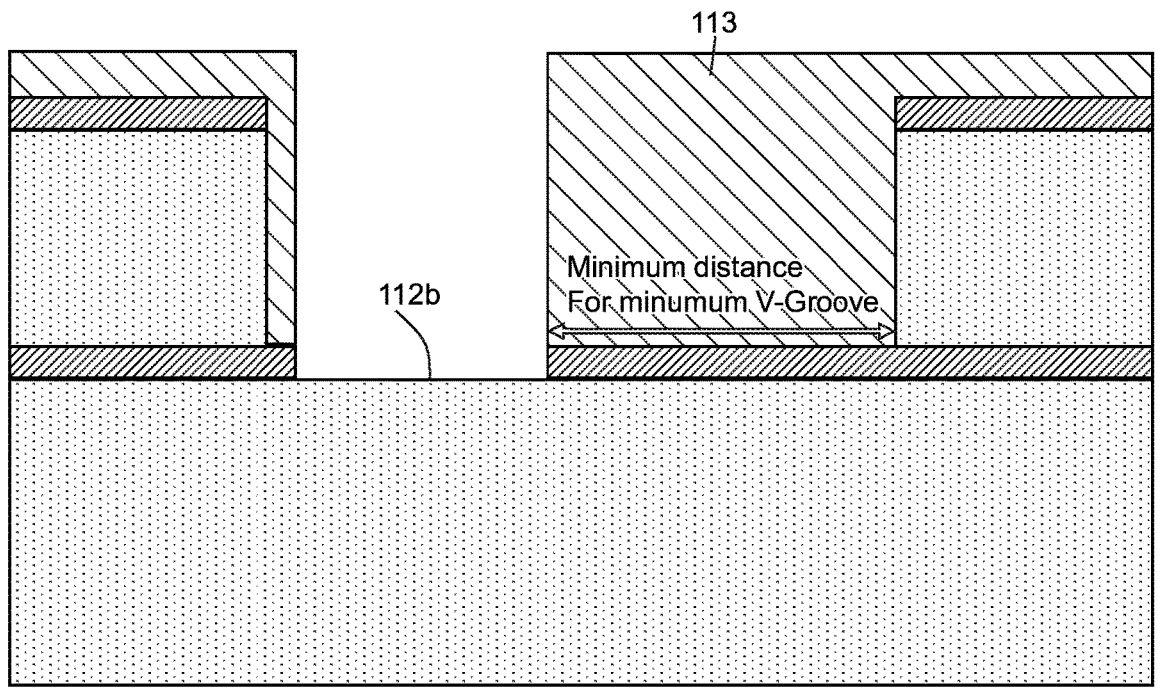
Figure 4E:
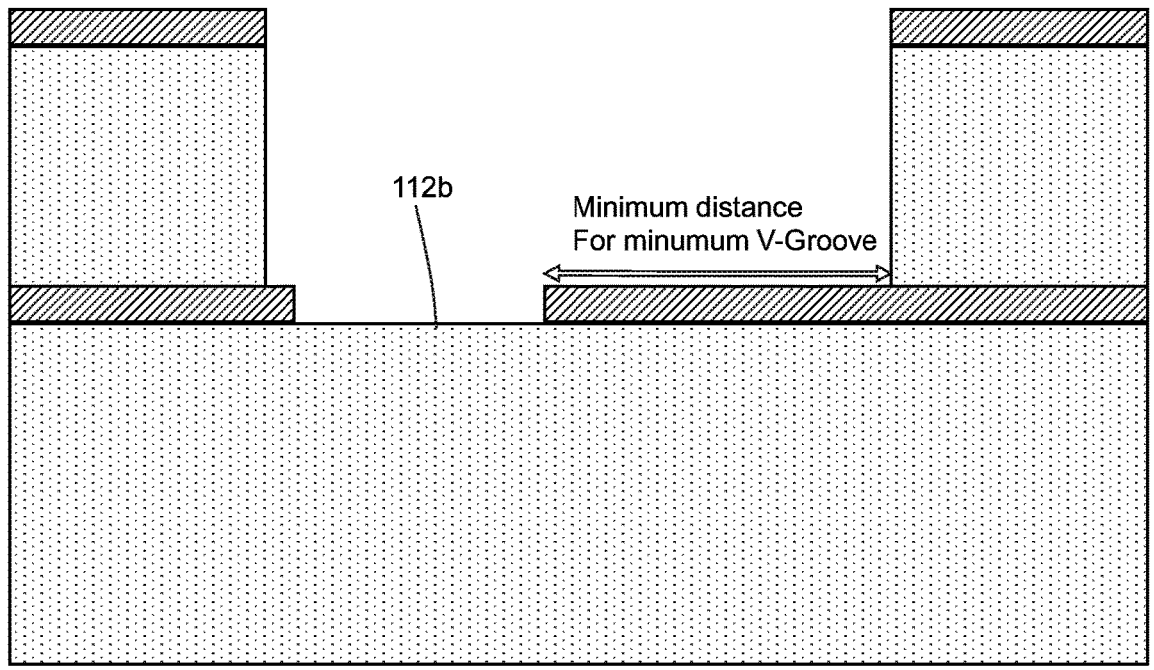
Figure 4F:
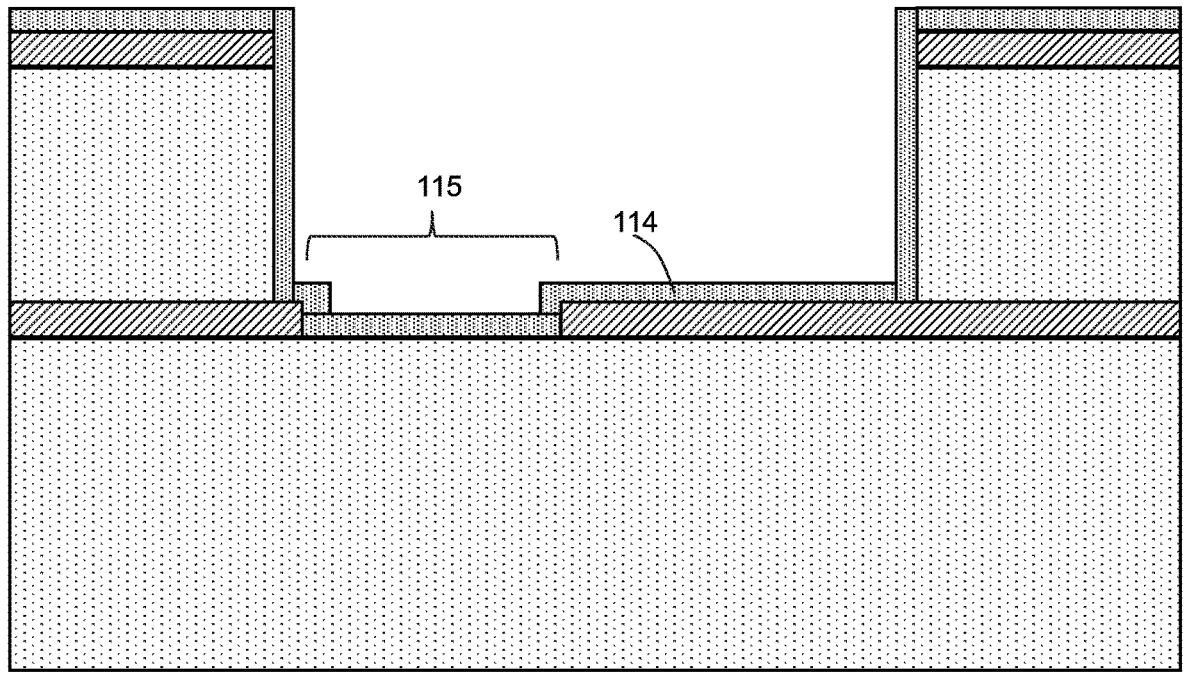

A dry etch is then applied to the exposed portion of the BOX layer 112a as shown in FIG. 4D to etch the BOX layer and leave an exposed region 112b of the silicon support layer. The photoresist is subsequently removed as shown in FIG. 4E and a nitride layer 114 applied using conventional techniques as shown in FIG. 4F. The nitride layer covers the base of the via, the sidewalls of the via and the upper surface of the silicon device layer 101. It includes a portion 115 which is located directly on top of the region of the silicon support layer 112b that had been exposed by previous etching steps. This portion of the nitride layer 115 will form a protective nitride layer in later steps.

Figure 4G:
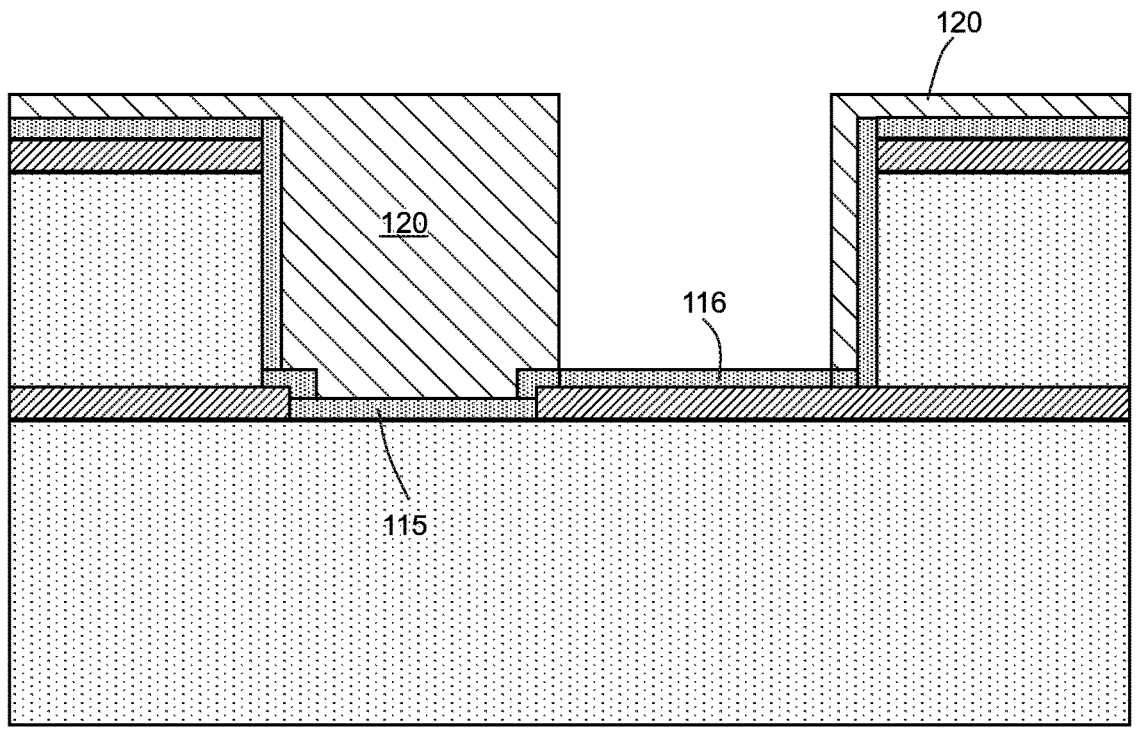
Figure 4H:
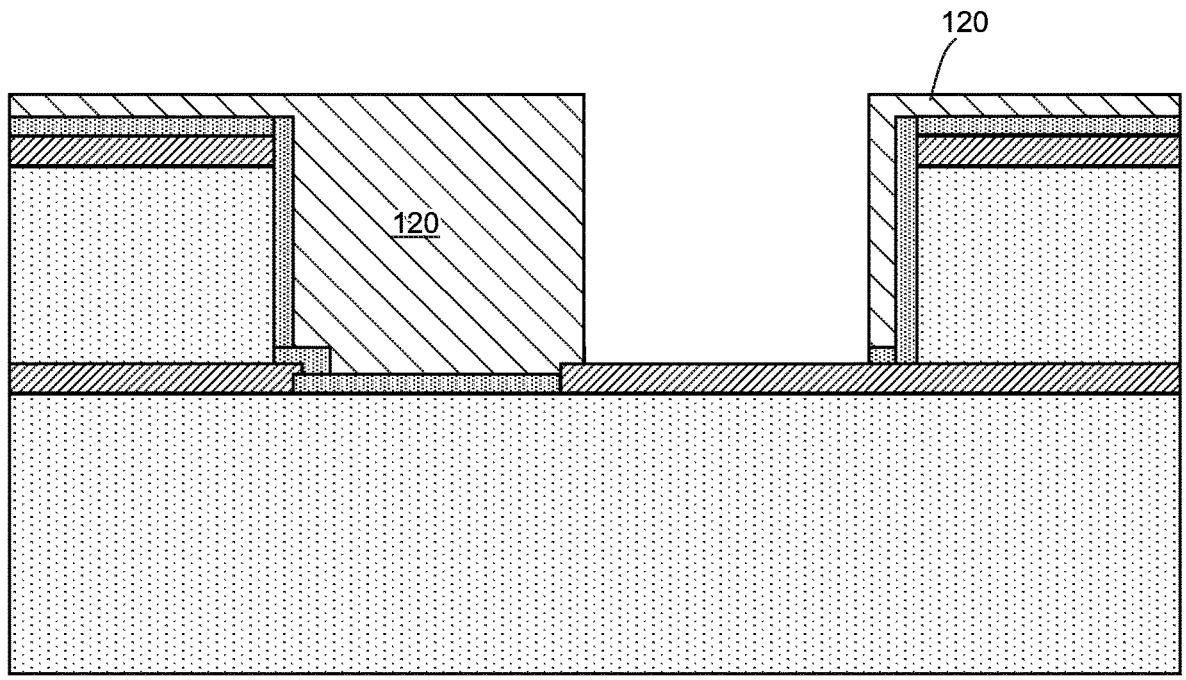

A further patterning photoresist 120 is applied as shown in FIG. 4G, this time covering the "protective" portion 115 of the nitride layer, but exposing a second region 116 of the nitride layer located at the base of the via. This second region 116 is subsequently etched in a dry etch step as shown in FIG. 4H.

Figure 4I:
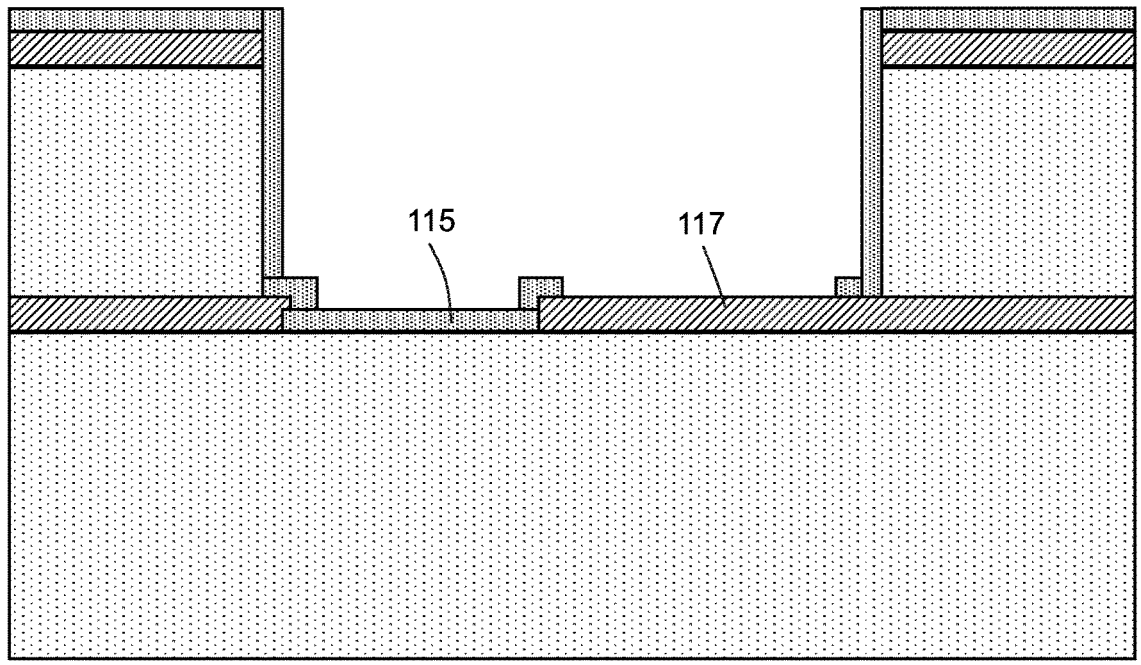
Figure 4J:
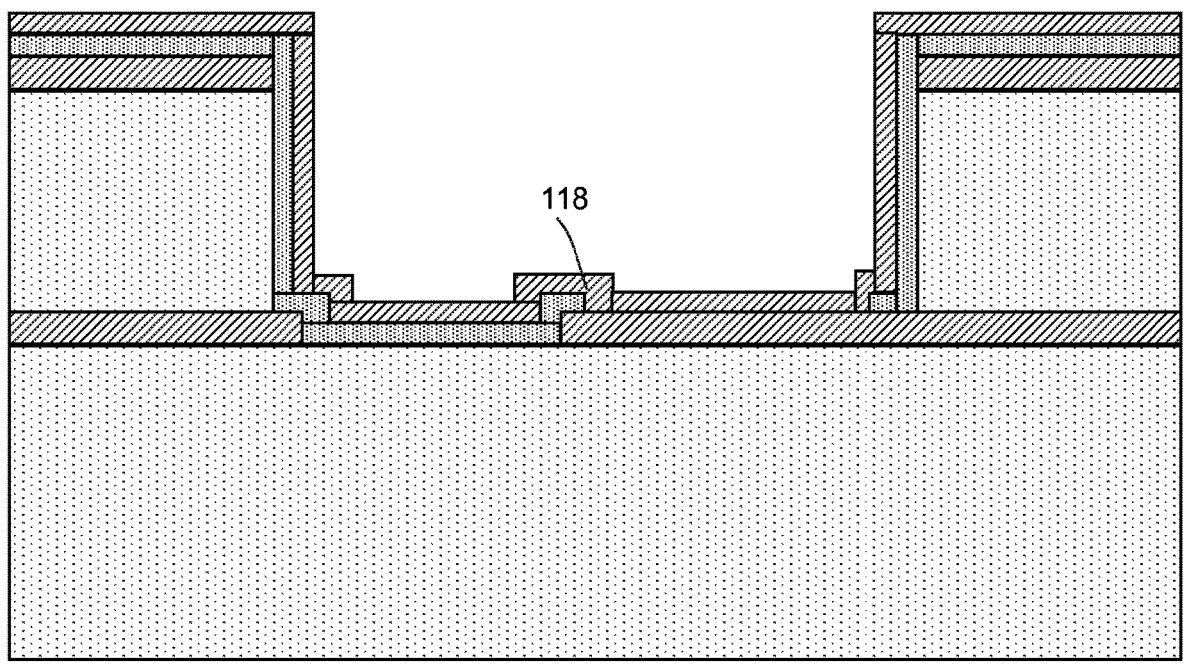

The photoresist 120 then is removed as shown in FIG. 4I, resulting in the base of the via being coated partially in a protective nitride layer (protective portion 115 of the nitride layer) and partially in an oxide layer 117 (that which was previously located underneath the second region 116 of the nitride layer). A layer of oxide 118 is then deposited, covering both portions of the base of the via, the sidewalls of the via and the upper surface of the silicon device layer 101.

Figure 4K:
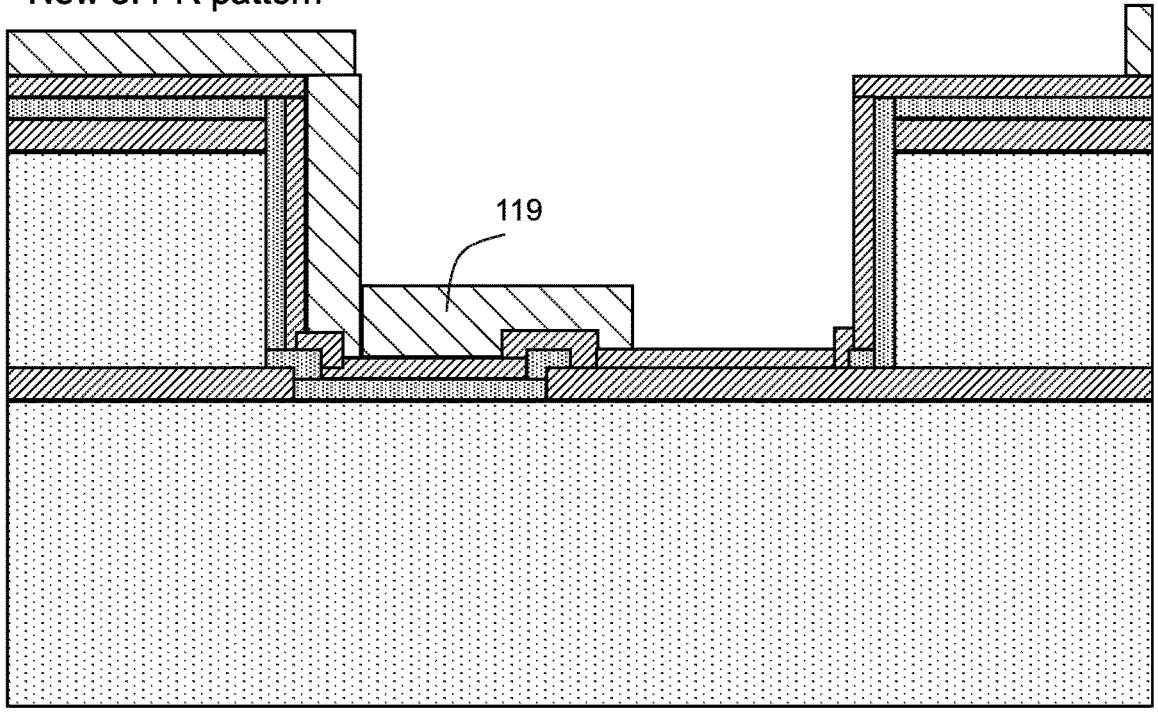
Figure 4L:
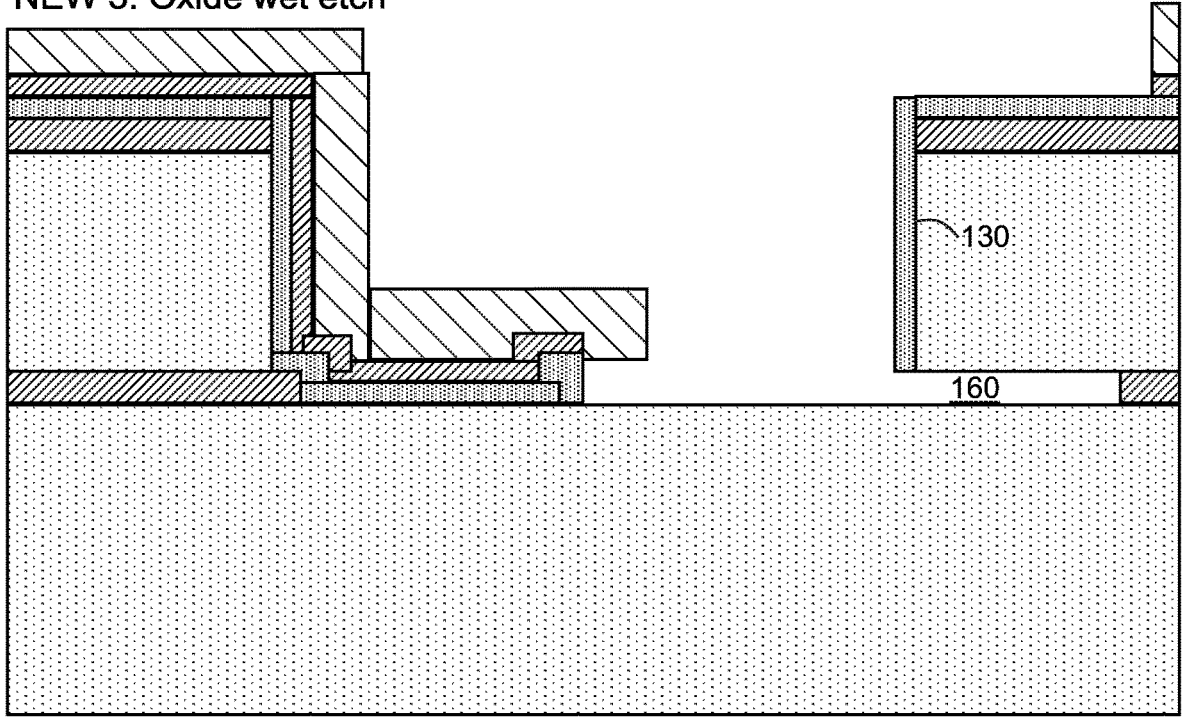

A further photoresist 119 is applied and patterned as shown in FIG. 4K, the photoresist leaving exposed: a region of the applied oxide layer located above the oxide layer portion 117 at the base of the via, a first sidewall 130 of the via which is located next to this oxide layer portion, and a region of the upper surface of the silicon device layer. A wet etch is then applied to the exposed layer as shown in FIG. 4L, the wet etch removing not only any oxide which is exposed, but also removing the BOX layer underneath the silicon device layer 101 on a first side of the via to create a channel 160 extending from the via in a first direction, undercutting the silicon device layer. The first direction is in the opposite direction from the protective nitride layer 115.

Figure 4M:
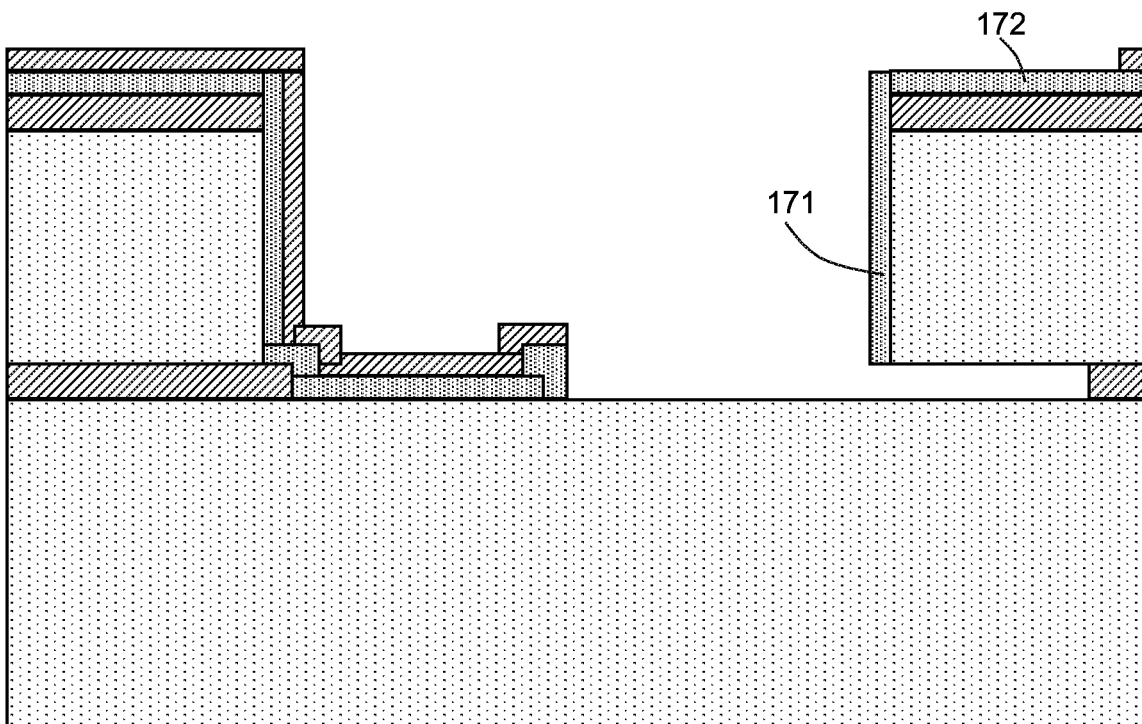
Figure 4N:
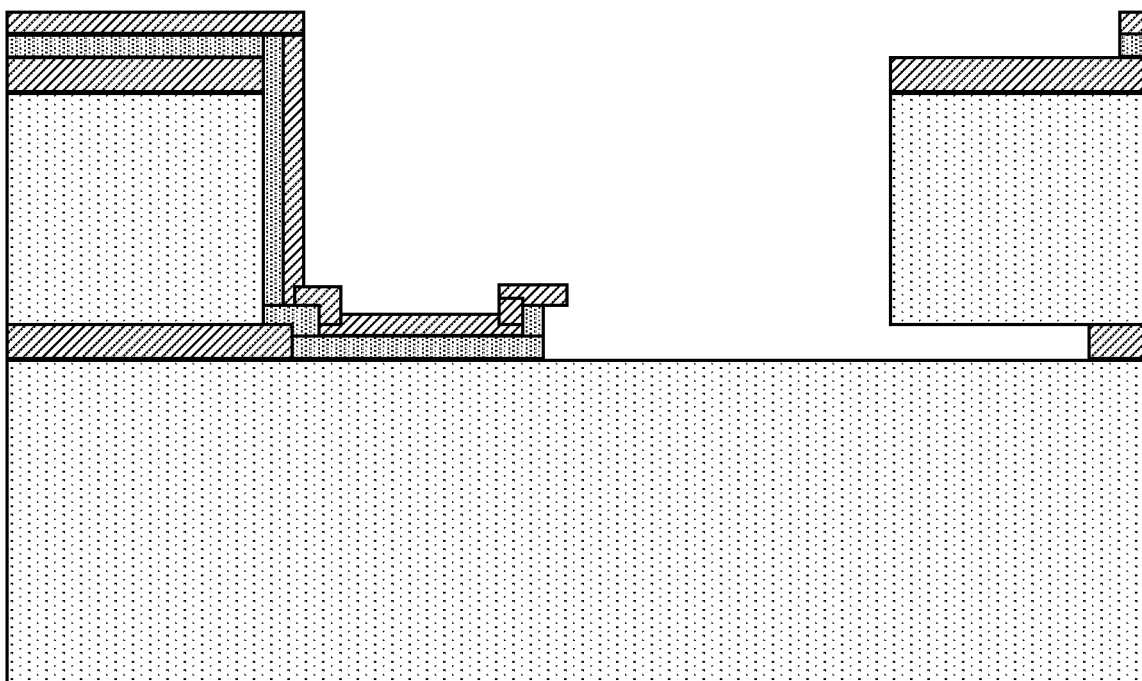

The photoresist 119 is removed as shown in FIG. 4M, and a Nitride wet etch applied to the nitride layer 171 at the first sidewall and any nitride 172 located on the upper surface of the undercut silicon device layer as shown in FIG. 4N.

Figure 4O:
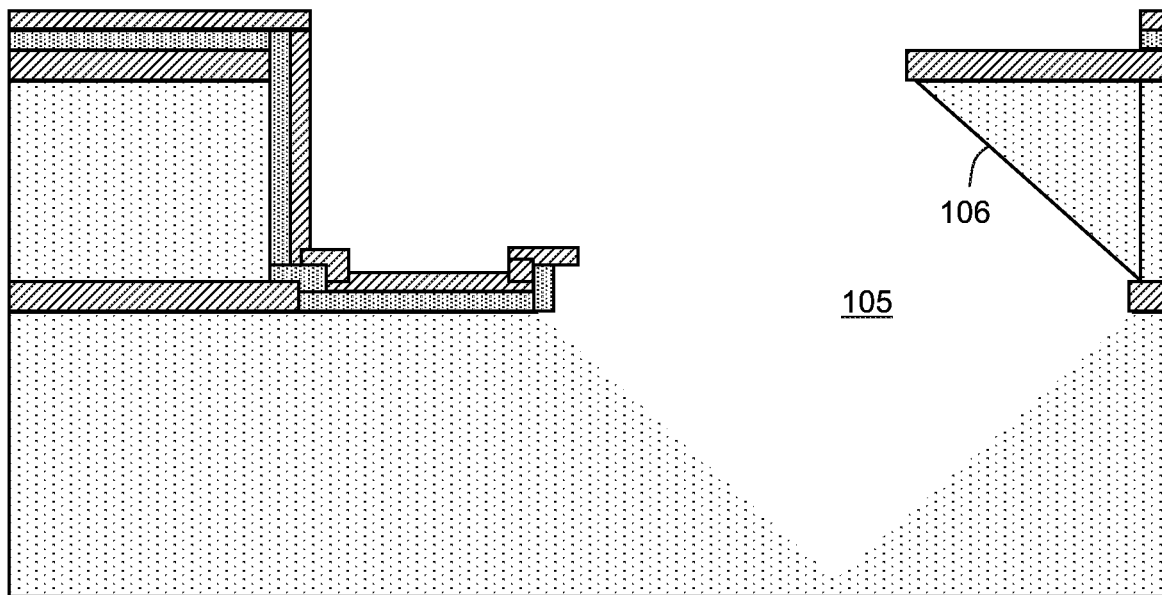

An anisotropic etch, in this case using TMAH is then carried out as shown in FIG. 4O, the etchant accessing regions to be etched by way of the via and by way of the channel. The channel 160 or "BOX undercut" provides an entry route for the etchant which results in etching taking place from the bottom of the silicon device layer upwards. This gives rise to an overhang in the silicon device layer. The crystal structure of the silicon device layer means that the anisotropic etch process leads to a cavity, one wall of which is formed by a planar underside surface of the overhanging silicon device layer. In this embodiment, the silicon device layer and the silicon support layer are oriented along the {100} plane (i.e. the wafer is cut along the (100) plane or equivalent) so the anisotropic etch is most selective to etching along the {111} plane, which results in an overhanging device layer with an underneath surface which extends along the {111} plane. The mirror therefore forms an angle of 54.7 degrees to the direction of the incident light.

Figure 4P:
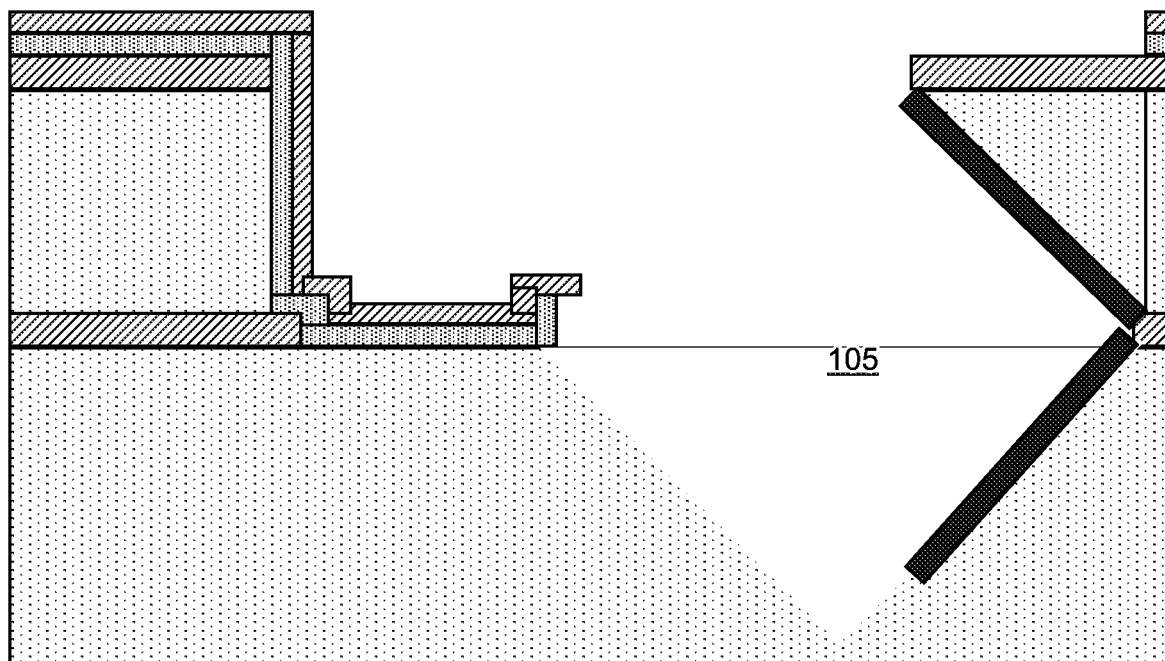

Subsequently, as shown in FIG. 4P a metal coating 206 is applied to the underside surface 106 by atomic layer deposition ALD.

Figure 5:
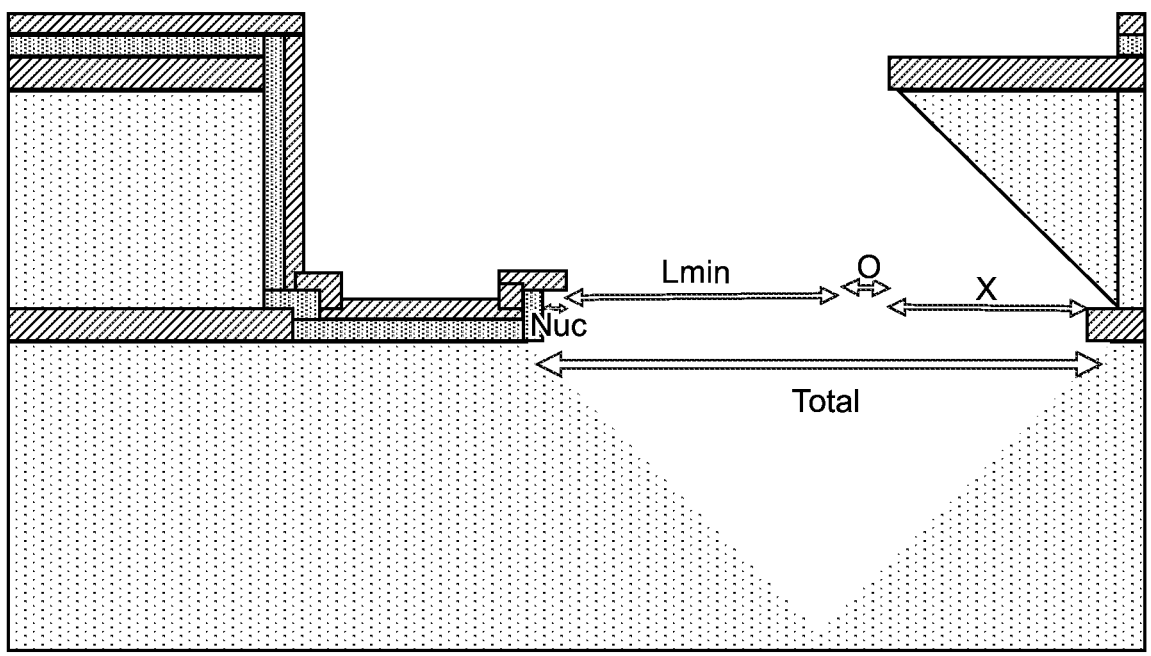
FIG. 5 depicts an example of an embodiment of FIG. 3, depicting example measurements.

FIG. 5 depicts an illustrative example of an embodiment of FIG. 3, depicting example measurements, where:

Omin~=2 um
Lmin~=2 um
Xmin=3/tan(54.7)~=2.12 um
Nuc~=0.3 um
Total~=6.42 um

Other measurements could be used and it is envisaged that the topography could be reduced down to a total measurement of 4.5 um or smaller since min depth=tan(54.7)*6.42 µm/2~=4.5 µm.

Advantageously, there is no requirement for an epitaxial layer to be grown within the cavity or for any other filling so process, which means that fabrication turn-around time is faster.

Figure 6A:
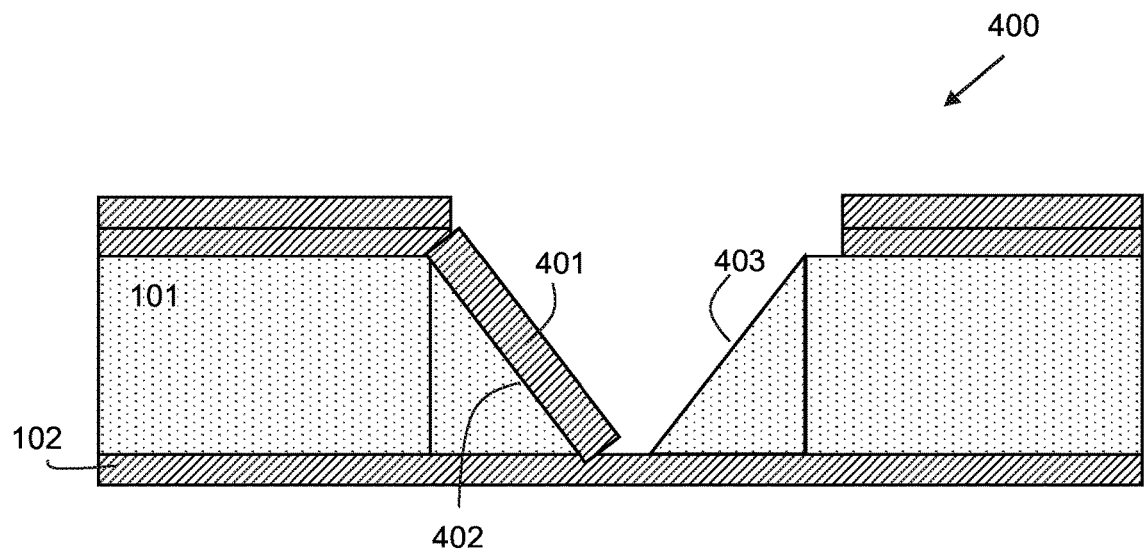
FIGS. 6A and 6B depict method steps in the fabrication of an alternative silicon photonic mirror according to further embodiments of the present invention.
Figure 6B:
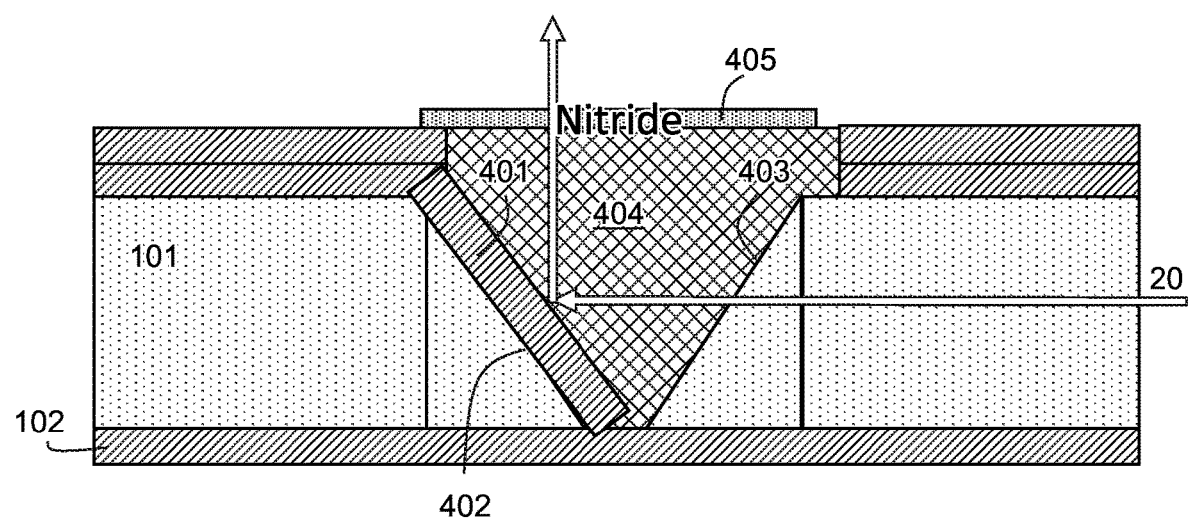

FIGS. 6A and 6B depict method steps in the fabrication of an alternative silicon photonic mirror 400. Like reference numerals correspond to features present in embodiments described above. As with previous embodiments, the mirror is a flipped mirror formed on a silicon on insulator substrate; although this time the etch step that produces the mirror facet is a "top-down" etch rather than a "bottom-up" etch, and does not extend into the BOX layer or the silicon support layer.

As shown in FIG. 6A, a V-groove is first etched in the silicon device layer 101. This can be carried out by an anisotropic etch which may involve first creating a vertical channel into which the etchant (e.g. TMAH) may be placed. An oxide layer 401 is then applied to only one of the two sloped sidewalls of the V-groove.

A subsequent step of regrowing epitaxial silicon is used to fill the V-groove (FIG. 6B) thereby creating an interface between the oxide layer 401 and the epitaxial material 404, which functions as a mirror facet. Light 20 propagating along a waveguide within the silicon device layer 101 will be reflected by this mirror faced and will exit the device vertically (i.e. at 90 degrees or substantially 90 degrees to the direction of propagation along the waveguide and at 90 degrees or substantially 90 degrees to the upper surface of the silicon device layer). Critically, the presence of the epitaxial layer means that there is no need for the light 20 to pass through air before it reaches the mirror facet.

An (optional) nitride layer may be located at the upper surface of the silicon device layer, above the V-groove, covering the region of the epitaxial silicon at which the reflected light enters/leaves the mirror device. In this way, it is possible to prevent the growth of an oxide layer at the entrance/exit and therefore improve the transmission of light through the upper surface of the silicon device layer 101.

Figure 7:
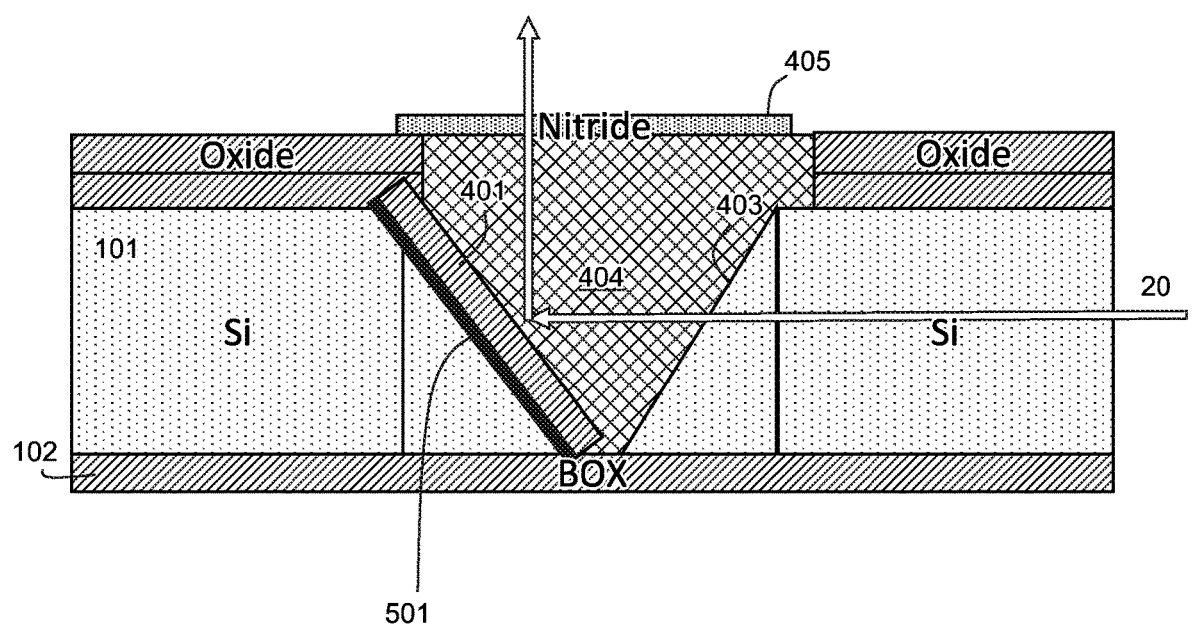
FIG. 7 is a schematic diagram of a silicon photonic mirror according to another embodiment of the present invention.

A further embodiment of a silicon photonic mirror is shown in FIG. 7 where like reference numerals correspond to features present in embodiments described above. The embodiment of FIG. 7 differs from that of FIG. 6A and FIG. 6B in that it further comprises a metal layer 501 located underneath the oxide layer 401.

Figure 8:
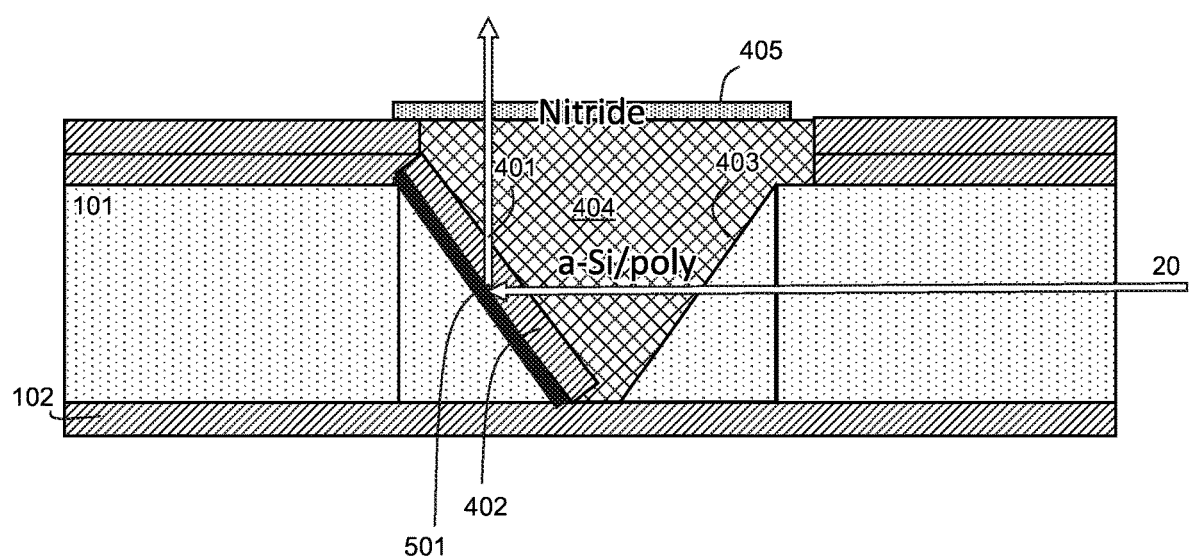
FIG. 8 is a schematic diagram of a silicon photonic mirror according to another embodiment of the present invention.

A further embodiment of a silicon photonic mirror is shown in FIG. 8 where like reference numerals correspond to features present in embodiments described above. The embodiment of FIG. 8 differs from that of FIG. 7 in that rather than an epitaxial layer of silicon; the V-groove is filled by a poly-silicon or amorphous silicon. A further variation (not shown) is envisaged corresponding to the mirror of FIG. 8, but without a metal surface coating located underneath the oxide layer 401.

The principal mirrored surface is created at the interface between the epitaxial filled material 404 and the surface of the oxide layer 401. At the primary reflection interface, light will be reflected when the angle of incidence at that interface is greater than a critical angle $\theta_{lim}$, the critical angle being determined by Snell's law. For the refractive indices of silicon (n=3.476) and silicon oxide (n=1.444), the critical angle can be calculated as: $\theta_{lim}$=a sin (1.44/3.476)=23.5 degrees. The metal layer 501 underneath the oxide layer will serve to reflect any light that is not reflected at the primary reflection interface between the oxide and the epitaxial fill. The thickness of the oxide will affect the strength of the light signal that is reflected, since there will be some optical leakage within the oxide.

The detailed description set forth below in connection with the appended drawings is intended as a description of exemplary embodiments of a waveguide mirror and method of fabricating a waveguide mirror provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Although exemplary embodiments of a waveguide mirror and method of fabricating a waveguide mirror have been specifically described and illustrated herein, many modifications and variations will be apparent to those skilled in the art. Accordingly, it is to be understood that a waveguide mirror and method of fabricating a waveguide mirror according to principles of this invention may be embodied other than as specifically described herein. The invention is defined in the following claims, and equivalents thereof.

What is claimed is:

1. A silicon photonic mirror comprising:
   a silicon support layer; a buried oxide (BOX) layer on top of the silicon support layer; and a silicon device layer on top of the BOX layer;
   a cavity extending through the silicon device layer, the BOX layer and a region of the silicon support layer, the walls of the cavity including:
      a planar underside surface defined by an overhanging portion of the silicon device layer, the planar underside surface being for vertically coupling light into and out of the silicon device layer, and
      an angled surface in the silicon support layer; and
   a metal surface applied to the planar underside surface.

2. The silicon photonic mirror of claim 1, wherein the planar underside surface forms an angle of 54.7 degrees relative to a top surface of the silicon device layer.

3. The silicon photonic mirror of claim 1, wherein the walls of the cavity include no more than one overhanging portion of the silicon device layer.

4. A method of fabricating a mirror, the method comprising:
   providing a silicon-on-insulator (SOI) substrate, the SOI substrate comprising: a silicon device layer on top of a BOX layer;
   creating a V-groove in the silicon device layer, the V-groove extending to the BOX layer and having a first angled wall and a second angled wall;
   providing a reflective coating to just one of the first and second angled walls of the V-groove to create a mirrored surface, the reflective coating comprising a metal layer; and
   growing silicon on top of the reflective coating to fill the V-groove, an interface between the grown silicon and the reflective coating forming a reflective surface of the mirror.

5. The method of claim 4, wherein the step of creating the V-groove includes:
   an initial step of providing an opening in an oxide layer, the oxide layer located directly on top of the silicon device layer; and
   a subsequent step of applying an anisotropic etch to the silicon device layer via the opening.

6. The method of claim 4, wherein the reflective coating further comprises an oxide layer.

7. The method of claim 4, wherein the silicon grown to fill the V-groove is epitaxial silicon.

8. The method of claim 4, wherein the silicon grown to fill the V-groove is poly-silicon or amorphous silicon.

9. The method of claim 4, further comprising the step of applying a nitride layer on top of the silicon that has been grown to fill the V-groove.

10. A silicon photonic mirror comprising:
    a silicon device layer on top of a BOX layer;
    a V-groove within the silicon device layer, the V-groove extending to the BOX layer and having a first angled wall and a second angled wall;
    a reflective coating on no more than one of the first and second angled walls of the V-groove and comprising a metal layer; and
    silicon on top of the reflective coating which fills the V-groove, an interface between the silicon and the reflective coating forming a reflective surface of the mirror.

11. The silicon photonic mirror of claim 10, wherein the reflective coating further comprises an oxide layer.

12. The silicon photonic mirror of claim 10, wherein the silicon which fills the V-groove is epitaxial silicon.

13. The silicon photonic mirror of claim 10, wherein the silicon which fills the V-groove is poly-silicon or amorphous silicon.

14. The silicon photonic mirror of claim 10, further comprising a nitride layer on top of the silicon that has been grown to fill the V-groove.

15. The silicon photonic mirror of claim 11, wherein the reflective surface is a first reflective surface, and the interface is a first interface between the silicon filling the V-groove and the oxide layer, and
    wherein a second interface between the oxide layer and the metal layer forms a second reflective surface of the mirror.

16. The silicon photonic mirror of claim 10, wherein the silicon which fills the V-groove is grown silicon.

17. A silicon photonic mirror comprising:
    a silicon device layer on top of a BOX layer;
    a V-groove within the silicon device layer, the V-groove extending to the BOX layer and having a first angled wall and a second angled wall;
    a reflective coating on no more than one of the first and second angled walls of the V-groove;
    silicon on top of the reflective coating which fills the V-groove, an interface between the silicon filling the V-groove and the reflective coating forming a reflective surface of the mirror; and
    a nitride layer on top of, and overlapping, the silicon filling the V-groove, and wherein the reflective coating comprises a metal layer, an oxide layer, or both a metal layer and an oxide layer on the metal layer.

18. The silicon photonic mirror of claim 17, wherein the silicon which fills the V-groove is epitaxial silicon.

19. The silicon photonic mirror of claim 17, wherein the silicon which fills the V-groove is poly-silicon or amorphous silicon.

* * * * *